United States Patent [19]
Soredal et al.

[11] 3,906,360
[45] Sept. 16, 1975

[54] METHOD FOR ELECTRICAL DAMPING OF MECHANICAL DISTURBANCES IN A MAGNETIC FIELD MEASURING SYSTEM

[75] Inventors: Gunnar S. Soredal; Curt Sivers, both of Stockholm, Sweden

[73] Assignee: LKB-Produkter AB, Bromma, Sweden

[22] Filed: Mar. 1, 1974

[21] Appl. No.: 447,207

[30] Foreign Application Priority Data
Mar. 1, 1973  Sweden.............................. 7302874

[52] U.S. Cl............................................. 324/43 R
[51] Int. Cl.²....................................... G01R 33/02
[58] Field of Search........................... 324/43 R, 47

[56]          References Cited
            UNITED STATES PATENTS
3,614,490  10/1971  Soredal................................ 324/47

Primary Examiner—Robert J. Corcoran

[57]          ABSTRACT

A method for reducing the influence of mechanical disturbances in a magnetic field measuring system which uses a loop positioned in the field and oscillatable due to interaction between the field and a current in the loop, the loop being supplied by an alternating current having a frequency considerably higher than the mechanical resonant frequency of the loop, employs a signal which is a component of the mechanical resonant frequency of the loop; the signal being fed back to the loop to obtain damping of mechanical oscillations.

3 Claims, 1 Drawing Figure

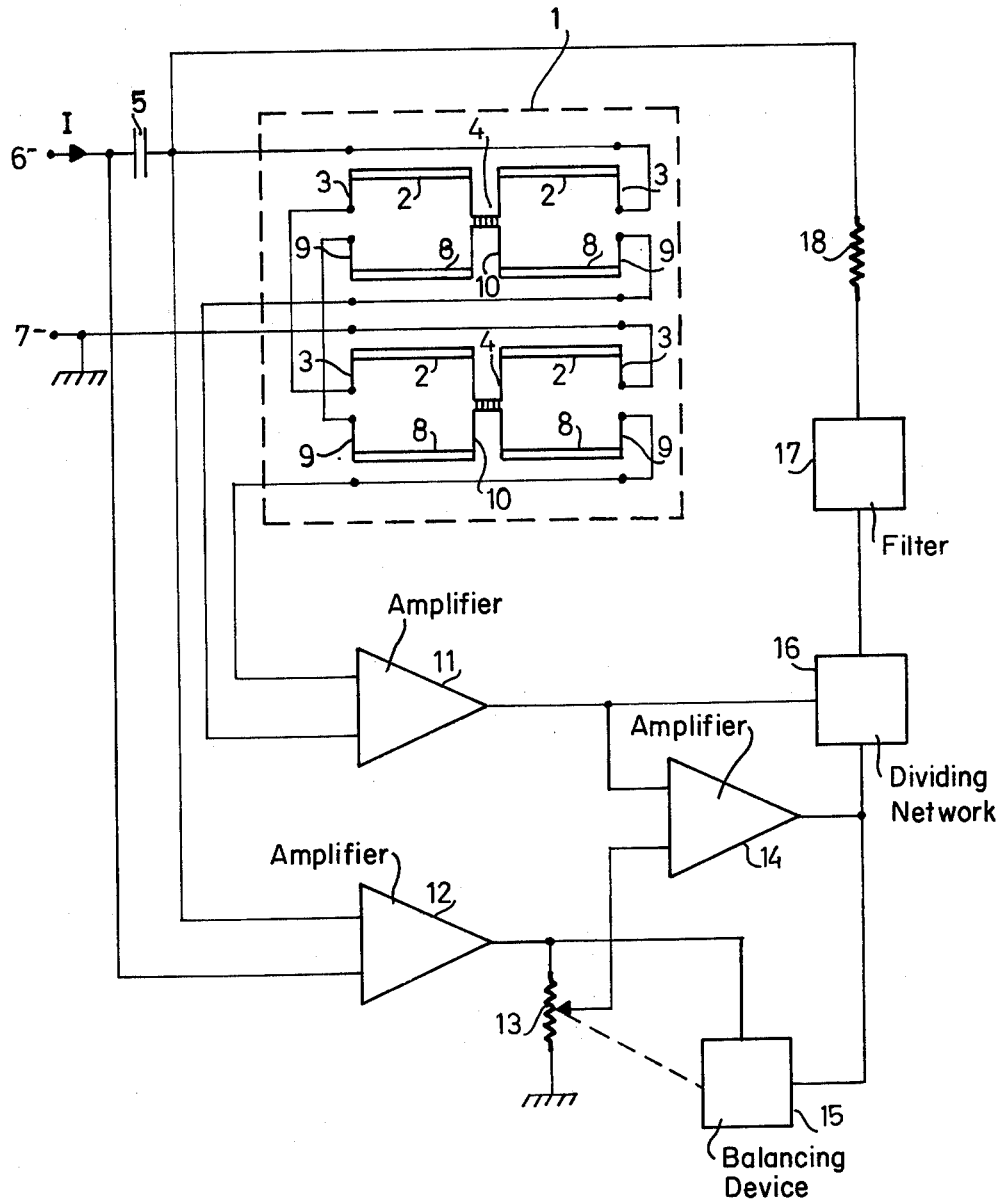

METHOD FOR ELECTRICAL DAMPING OF MECHANICAL DISTURBANCES IN A MAGNETIC FIELD MEASURING SYSTEM

The present invention refers to a method for reducing the influence of mechanical disturbances in a magnetic field measuring system consisting of a transducer comprising a movable loop arranged in the field to be oscillatable in response to interaction of the field and a current in the loop, the loop being supplied by an alternating current having a frequency considerably higher than the mechanical resonant frequency of the loop, the voltage generated across the loop due to its movement in the magnetic field being proportional to the square of the strength of the magnetic field, the measurement being performed by comparing the induced voltage and a variable voltage being 90° phase shifted in respect to the current of the supply circuit, said comparison voltage constituting an error signal which effects the variable voltage in order to decrease the error signal.

In the U.S. Pat. No. 3,614,490 there is described a device for generating and measuring a voltage proportional to the square of the magnetic field. The device comprises a transducer consisting of a number of hinged systems each comprising a number of conductors, the system being connected to an alternating current source which generates an alternating current of a frequency considerably higher than the mechanical resonant frequency of the system. The system of conductors forms a primary circuit which could be mechanically engaged to a secondary circuit of a similar design. If the transducer is located within the magnetic field to be measured, a measuring voltage will be obtained within the secondary circuit due to induction because of oscillations in the system, said measuring voltage being proportional to the square of the field strength of the magnetic field.

By using the device described above a very high degree of measuring accuracy can be obtained. If, however, the device is subject to mechanical vibrations this will complicate the measuring and it is thus desirable to damp the system. It is however difficult to obtain a mechanical purely viscous damping which is necessary, since if the damping is not viscous, the measuring voltage generated will comprise harmonics of the measuring frequency which makes the measuring complicated.

For measuring the induced voltage a method described in connection with FIG. 7 in the above mentioned patent is preferably used. This measurement is based on the fact that the voltage generated is 90° phase shifted in relation to the current that generates the oscillation in the primary circuit and is proportional to the amplitude of the current and inversely proportional to its frequency. By connecting the primary circuit in series with a capacitor it is therefore possible to obtain a reference voltage to be used when measuring the induced voltage. The ratio between this reference voltage and the measuring voltage will be independent of the amplitude of the alternating current and its frequency and will thus form a direct measure of the square of the strength of the magnetic field. The measuring is thereby performed by comparing the reference voltage and the measuring voltage in a comparator which generates an error signal which is used to adjust that part of the reference voltage which is supplied to the comparator in such a way that the amplitude of the error signal is decreased. When the error signal is zero the comparator is balanced and the fraction of the reference voltage supplied to the comparator is a direct measure of the strength of the magnetic field.

It is an object of the present invention to obtain a purely viscous damping of the primary circuit for oscillations at its mechanical resonant frequency by electrical means in using the above described measuring method. The method according to the invention is characterized in that the a signal is fed back to the primary circuit so as to damp the oscillations in this circuit.

The method according to the invention will now be described in detail reference being made to the enclosed drawing which shows a device for carrying out the method according to the invention.

In the drawing, reference 1 denotes a transducer designed in accordance with the above cited patent, the transducer being located in a magnetic field of a direction perpendicular to the plane of the FIGURE. The transducer consists of a primary circuit formed by four resiliently hinged rods 2. These rods are mounted and connected in series by means of mounting springs 3 and connecting springs 4. In order to increase the stability of the system in the direction of the magnetic field the rods are bent at their ends and the mounting springs are doubled. The primary circuit is connected in series with a reference capacitor 5 and furthermore connected to an alternating voltage generator (not shown) which supplies a current I through the terminals 6,7 the terminal 7 being connected to ground. The transducer furthermore comprises a secondary circuit consisting of four rods 8 mounted in double mounting springs 9 and connected by means of connecting springs 10. The connecting springs 4 and 10 in the primary and secondary circuit respectively are mechanically connected, but electrically isolated from each other. The secondary circuit is connected to an amplifier 11 having a constant gain both concerning amplitude and phase. The voltage across the reference capacitor 5 is supplied to another amplifier 12 which also has a well-defined gain. The output of the amplifier 12 is connected to an adjustable voltage divider 13 consisting of resistors of constant resistance. Between the movable contact arm the voltage divider 13 and the output of the amplifier 11, an amplifier 14 is connected. The output of the amplifier 14 is connected to a balancing device 15. The device 15 consists of a phase sensitive amplifier controlled by the output of the amplifier 12 and generating an output signal which affects the contact arm of the voltage divider 13 in such a direction that the output signal of measuring frequency from the amplifier 14 is decreased. Thus the device 15 serves the purpose of equalizing the input signals of measuring frequency to the amplifier 14. The device hitherto described principally corresponds to the device shown in FIG. 7 in the above cited patent. The voltage supplied through the amplifier 11 will have a 90° phase shift in relation to the current I and will furthermore be proportional to this current and the square of the magnetic field strength and be inversely proportional to the frequency of the current I. The voltage supplied to the amplifier 12 will also have a phase shift of 90° in relation to the current I and will furthermore be proportional to this current and inversely proportional to its frequency. The error signal obtained at the output of the amplifier 14 will thus only be dependent on the amplitude of the magnetic field which means that the movable contact arm of the resistor 13 will have position directly corresponding to the strength of the magnetic field when the output signal from the amplifier 14 is zero.

According to the invention the output of the amplifier 14 is also connected to the primary circuit of the magnetic field transducer. The connection is suitably made via a dividing network 16, a filter 17 and a resistor 18, the function of these components being described in detail below. If the hinged systems in the transducer 1 are oscillating due to an exterior mechanical vibration they will oscillate with their mechanical resonant frequency and thus generate a voltage of this frequency which is supplied to the amplifier 11. A voltage of this frequency will then appear at the output of the amplifier 14. This voltage will not effect the balancing device 15 since this device is only sensitive to signals of measuring frequency. The output signal from the amplifier 14 will however be supplied to the primary circuit via the circuits 16, 17 and the resistor 18, which means that if the signal thus supplied to the primary circuit has phase shift of 180° in relation to the voltage generated by the mechanical vibration, a damping will be obtained. The phase inversion could take place either in the amplifier 11 or by means of a separate phase inverter in the feed back loop from the output of the amplifier 14. If all components have linear characteristics with respect to voltages of a frequency equal to the resonant frequency of the hinged system, the damping will be purely viscous and will thus not generate any harmonics in the measuring voltage. The feed back will further more not introduce any measuring error since it is dependent on the voltage from the output of the amplifier 14, this voltage not comprising any components of the measuring frequency when the loop 15-13 is balanced. The measuring frequency current through the transducer 1 and the reference capacitor 5 will thus have the same amplitude. The voltage generated at the output of the amplifier 11 due to the mechanical vibration will be dependent upon the magnetic field through the transducer 1 and is increased as the magnetic field strength increases. In order to avoid self-oscillation in the feed back loop from the output of the amplifier 14 to this primary circuit, it is therefore suitable to introduce in the loop, a network having the properties of damping the signal obtained from the amplifier 14 if the output signal from the amplifier 11 exceeds a certain value. The damping property of the network 16 could thereby suitably be defined so as to make the network divide the input signals from the amplifier 14 with the signal from the output from the amplifier 11 when this latter signal exceeds a certain value.

At the first harmonic of the resonant frequency the induced voltage will have the same phase as the driving current, whereas at measuring frequency which is several times higher a phase shift of approximately 90° will be obtained between current and voltage. As the voltage supplied to the amplifier 14 from the amplifier 11 when the system oscillates at its mechanical resonant frequency has the same phase as the induced voltage, the phase shift of the feed back loop shall be approximately 180° at the first harmonic of the resonant frequency in order to make the damping as effective as possible. At measuring frequency which is considerably higher than the resonant frequency the phase shift of the loop should be approximately 90°. If the phase angle considerably differs from 90°, a component of the error voltage which is phase shifted 90° from the reference voltage to give rise to a voltage having the same phase as the reference voltage and thus the measuring error will be introduced. In order to obtain the desired frequency characteristics in the feed back loop a filter 17, having 180° phase shift at the mechanical resonant frequency and having a 90° phase shift at the measuring frequency is introduced. The filter, suitably of an active type with an inherent gain should preferably have a gain which is high at the mechanical resonant frequency and low at the measuring frequency.

We claim:

1. In a method for reducing the influence of mechanical disturbances in a magnetic field measuring system of the type consisting of a transducer comprising a loop arranged in the field and oscillatable in response to interaction between the field and a current in the loop and supplied by an alternating current having a frequency considerably higher than the mechanical resonant frequency of the loop, the voltage generated across the loop due to its movement in the magnetic field being proportional to the square of the strength of the magnetic field the measurement being performed by comparing the induced voltage and a variable voltage being 90 degrees phase shifted in respect to the current of the supply circuit, said comparison generating a signal comprising a component of said alternating current frequency which component constitutes an error signal which increases or decreases said variable voltage in order to decrease said component, the improvement comprising the step of feeding back to the loop any component of the mechanical resonant frequency of said error signal to obtain a damping of oscillations of the mechanical resonant frequency of the system.

2. Method of claim 1, which includes the step of feeding said component of the mechanical resonant frequency through a filter having high damping and approximately 90° phase shift at said alternating current supply frequency and low damping and approximately 180° phase shift at the mechanical resonant frequency.

3. Method of claim 1, which includes the step of reducing the degree of feed back of said component when the induced voltage exceeds a predetermined voltage.

* * * * *